(12) United States Patent
Kumar et al.

(10) Patent No.: US 11,373,015 B2
(45) Date of Patent: Jun. 28, 2022

(54) DESIGNING A 3D MODELED OBJECT REPRESENTING A MECHANICAL STRUCTURE

(71) Applicant: Dassault Systemes SolidWorks Corporation, Waltham, MA (US)

(72) Inventors: Utpal Kumar, Acton, MA (US); Satish Rao Kanjarkar, Billerica, MA (US); Sachin Darwatkar, Pune (IN); Rajendrasing Pardeshi, Pune (IN)

(73) Assignee: DASSAULT SYSTEMES SOLIDWORKS CORPORATION, Waltham, MA (US)

( * ) Notice: Subject to any disclaimer, the term of this patent is extended or adjusted under 35 U.S.C. 154(b) by 750 days.

(21) Appl. No.: 16/123,866

(22) Filed: Sep. 6, 2018

(65) Prior Publication Data
US 2020/0019649 A1    Jan. 16, 2020

(30) Foreign Application Priority Data
Jul. 16, 2018 (IN) .............................. 201821026547

(51) Int. Cl.
*G06F 30/00*    (2020.01)
*G06F 111/04*    (2020.01)
*G06F 111/20*    (2020.01)

(52) U.S. Cl.
CPC .......... *G06F 30/00* (2020.01); *G06F 2111/04* (2020.01); *G06F 2111/20* (2020.01)

(58) Field of Classification Search
CPC ... G06F 30/00; G06F 2111/04; G06F 2111/20
See application file for complete search history.

(56) References Cited

U.S. PATENT DOCUMENTS 7,062,887 B1 *  6/2006  Holdren ................... B63B 3/26
                                                    52/653.1
9,230,044 B1 *  1/2016  McKendrick ........... G06F 30/00
(Continued)

FOREIGN PATENT DOCUMENTS

JP    2016177466 A  * 10/2016
JP    2017174953 A  *  9/2017

OTHER PUBLICATIONS

Autodesk; https://www.youtube.com/watch?v=g8HOhkleDDI; "AutoCAD Plant 3D Tutorial: How To Create Structural Objects" (Year: 2009).*

(Continued)

*Primary Examiner* — Rehana Perveen
*Assistant Examiner* — Nupur Debnath
(74) *Attorney, Agent, or Firm* — Hamilton, Brook, Smith & Reynolds, P.C.

(57) ABSTRACT

The invention notably relates to a computer-implemented method for designing a 3D modeled object by interaction of a user with a feature-based CAD system, the 3D modeled object representing a mechanical structure. The method comprises creating structural member features, each structural member feature representing a respective structural member of the mechanical structure, and displaying to the user a graphical representation of the mechanical structure based on the structural member features. The method further comprises creating corner features, each corner feature representing a respective corner of the mechanical structure, the creation of the corner features being performed automatically by the system, the corner features being editable by the user. This provides improved ergonomics for structural design.

18 Claims, 5 Drawing Sheets

(56) References Cited

U.S. PATENT DOCUMENTS

| | | | | |
|---|---|---|---|---|
| 9,841,750 | B2* | 12/2017 | Willis | G05B 19/4099 |
| 2005/0126084 | A1* | 6/2005 | Woksa | E04B 2/702 |
| | | | | 52/79.1 |
| 2014/0375636 | A1* | 12/2014 | Young | B33Y 50/00 |
| | | | | 345/420 |
| 2016/0086375 | A1* | 3/2016 | Devaki | G06F 30/13 |
| | | | | 345/419 |
| 2016/0232259 | A1* | 8/2016 | Williams | G06F 30/00 |
| 2018/0089336 | A1* | 3/2018 | Ninomiya | G06F 30/13 |

OTHER PUBLICATIONS

John Bordeau; https://www.youtube.com/watch?v=X85V1Oz18f0; "AutoCAD I Apr. 2022 Drawing Rectangles Adding Rounded Corners" (Year: 2015).*

AutoCAD Architecture; https://knowledge.autodesk.com/support/autocad-architecture/learn-explore/caas/CloudHelp/cloudhelp/2018/ENU/AutoCAD-Architecture/files/GUID-A90E26B3-13EB-4355-9838-F7E871C53D6F-htm.html;(Year: 2017).*

AutoCAD Architecture; https://knowledge.autodesk.com/support/autocad-architecture/learn-explore/caas/CloudHelp/cloudhelp/2017/ENU/AutoCAD-Core/files/GUID-9B7E3BCD-4AD2-47AE-A991-D7CF66E62D36-htm.html?v=2017&st=weld; (Year: 2016).*

JaysCADD; "SolidWorks Structural Members"; https://www.youtube.com/watch?v=kht7-aHb3yc, published on Jan. 28, 2013 (Year: 2013).*

Kayhan, Baris "Structural Member Design and Simulation with SolidWorks" https://www.youtube.com/watch?v=oFOsXb34IWU, published on Jul. 3, 2013.

BuildingPoint Australia "Telka Structures Steel Detailing" https://www.youtube.com/watch?v=RBOIKIN6cGg, published on Aug. 1, 2013.

Graitec Group "Create your building in minutes with Advanced Steel" https://www.youtube.com/watch?v=dCYT7N7Z-Uk, published on Apr. 8, 2014.

Autodesk Building Solutions Structural Steel Connections in Revit 2017 and Advanced Steel 2017 https://www.youtube.com/watch?v=OX7dQJDYj84, published on May 26, 2016.

* cited by examiner

(prior art)

DESIGNING A 3D MODELED OBJECT REPRESENTING A MECHANICAL STRUCTURE

RELATED APPLICATION(S)

This application claims priority under 35 U.S.C. § 119 or 365 to India, Application No. 201821026547, filed Jul. 16, 2018. The entire teachings of the above application(s) are incorporated herein by reference.

FIELD OF THE INVENTION

The invention relates to the field of computer programs and systems, and more specifically to a method, system and program for designing a 3D modeled object that represents a mechanical structure.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA™, SOLIDWORKS™, ENOVIA™ and DELMIA™) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Some of these software products offer solutions specifically directed to structural design, that is, the design of a modeled object that represents a mechanical structure. This is the case for example of Tekla™ by company Trimble, Advance Steel™ by company Graitec, or Revit™ by company Autodesk.

Although these existing tools offer functionalities aiming at facilitating structural design for the user, there is still a need for improving ergonomics in this field.

SUMMARY OF THE INVENTION

It is therefore provided a computer-implemented method for designing a 3D modeled object by interaction of a user with a feature-based CAD system. The 3D modeled object represents a mechanical structure. The mechanical structure includes structural members. The mechanical structure further includes corners. The respective structural members are connected together at each corner. The method comprising creating structural member features. Each structural member feature represents a respective structural member of the mechanical structure. The method also comprises displaying to the user a graphical representation of the mechanical structure based on the structural member features. The method also comprises creating corner features. Each corner feature represents a respective corner of the mechanical structure. The creation of the corner features is performed automatically by the system. The corner features are editable by the user.

The method may comprise one or more of the following:
- the method further comprises displaying one or more graphical items each indicative of a respective corner feature, each graphical item being selectable by the user for edition of its respective corner feature;
- the method comprises displaying a list including the one or more graphical items;
- the method comprises displaying the graphical representation of the mechanical structure in a first display area, and the list in a second display area;
- creating the structural member features comprises, for at least one extremity of the respective structural member represented by at least one structural member feature, by the user, positioning said at least one extremity at a location where another structural member is already positioned, and then, automatically by the system, generating information describing said positioning, the creation of a respective corner feature being based on said information;
- the positioning comprises a selection of the other structural member or of a geometrical element of a grid where the other structural member is positioned, the information describing said positioning comprising an indication of such selection;
- at least one corner feature is adapted for any one or any combination of the following editions, with respect to one or more of the structural member features connected together at the corner represented by the at least one corner feature, specifying trimming information, specifying a connection type, and/or defining a connected element;
- the corner features are selectable and editable in bulk, and/or the system is adapted for automatic replication of a user edition of a corner feature to one or more other corner features;
- the creation of a corner feature includes determining a type depending on the number of structural members connected at the corner and/or on the location of the connection with respect to the connected structural members; and/or
- the mechanical structure is a building, a machine frame, a structure system based on an aluminum extrusion profile, a steel structure, a welded structure, or a vehicle structure.

It is further provided a computer program comprising instructions for performing the method.

It is further provided a non-transitory computer readable storage medium having recorded thereon the computer program.

It is further provided a system comprising a processor coupled to a memory and a graphical user interface, the memory having recorded thereon the computer program.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Embodiments of the invention will now be described, by way of non-limiting example, and in reference to the accompanying drawings, where.

DETAILED DESCRIPTION OF THE INVENTION

A description of example embodiments follows.

Figure 1:
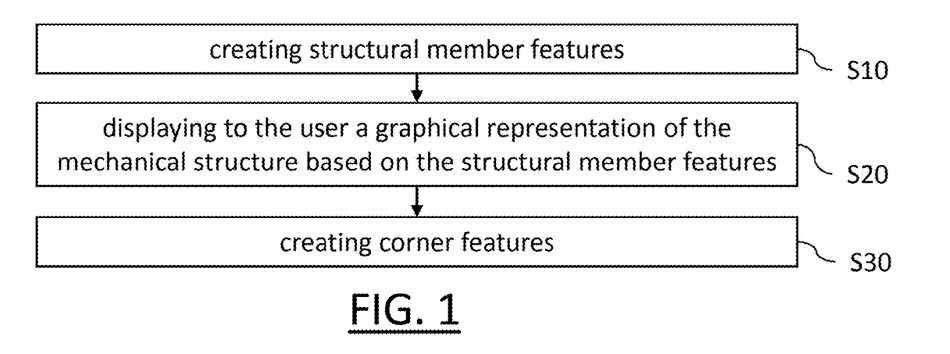
FIG. 1 shows a flowchart of an example of the method.

With reference to the flowchart of FIG. 1, it is proposed a computer-implemented method for designing a 3D modeled object by interaction of a user with a feature-based CAD system. The designed 3D modeled object represents a mechanical structure. The mechanical structure includes structural members and corners. At each corner of the mechanical structure, respective structural members of the mechanical structure are connected together. The method comprises creating S10 structural member features. Each structural member feature represents a respective structural member of the mechanical structure. The method also comprises displaying S20 a graphical representation of the mechanical structure to the user. The graphical representation displayed at S20 is based on the structural member features created at S10. The method also comprises creating S30 corner features. Each corner feature represents a respective corner of the mechanical structure. The creation S30 of the corner features is performed automatically by the system. The corner features created at S30 are editable by the user.

Such a method forms a solution for structural design which presents improved ergonomics.

Notably, the method of FIG. 1 allows designing a 3D modeled object by creating structural member features at S10 and displaying a graphical representation at S20, thereby permitting a user to interact with a feature-based CAD system so as to represent a mechanical structure in the system. In addition, the method of FIG. 1 comprises the creation of a specific type of features at S30, namely corner features. Although corners of the mechanical structure are already indirectly represented by the structural member features (namely by where the structural members represented by said structural member features are connected together), the additional creation of corner features at S30 allows direct parameterization of these corners in the system. The presence of corner features thereby improves representation of the mechanical structure to the user. Moreover, the corner features being editable, the user is not limited to editing structural member features in order to represent physical aspects relative to corners. The method thus widens the scope of design possibilities offered to the user. Furthermore, the creation S30 is automatic, the method being thereby particularly ergonomic.

The expression "mechanical structure" designates as known per se from the field of structural engineering any real-world product (i.e. an object or assembly) which presents a mechanical skeleton or mainframe. In other words, a mechanical structure comprises structural members (i.e. elongate solids, optionally rigid) which are connected together. Two structural members are said to be connected together if they join or contact each other. Locations of the mechanical structure at which structural member are connected are called "corners". The connections may be of any type, for example mechanical (e.g. achieved via a fastener, or alternatively a mere contact), chemical (e.g. achieved by sticking), and/or thermic (e.g. achieved using thermic energy, for example via welding). Connections may or may not leave one or more degrees of freedom. In examples of the case of a mechanical connection achieved via a fastener, the fastener may allow rotation of the connected structural members around one single axis. In examples of the case of a welding connection, the weld may forbid any movement of the connected structural members one relative to another.

The structural members of the mechanical structure of the method may comprise straight structural members and/or curved structural members. The mechanical structure may be defined with respect to a main axis aligned with the vertical axis. In such a case, the structural members may comprise horizontal structural members, which may also be referred to as "beams", and/or vertical structural members, which may also be referred to as "columns".

The mechanical structure may be any type of mechanical structure, for example a metal structure. Examples of metal structures which may be represented by the 3D modeled object designed by the method include:

- a machine frame, the structural members being for example bars forming the mechanical frame of a machine, the machine being any type of machine such as a measurement and/or production machine,
- a structural system based on one or more aluminum extrusion profiles, the structural members being for example aluminum extrusions optionally presenting all a same profile or alternatively at least two different profiles,
- a steel structure, the structural members being for example steel beams, steel reinforcement bars and/or steel columns, optionally supporting a building or any type of construction, the corners being for example achieved with bolted joints.
- a welded structure, the corners being for example achieved with weld joints between structural members which may be bars (note that a steel structure and a welded structure may be designed in a same way), or
- a vehicle structure, the structural members forming for example the supporting frame of a vehicle, e.g. which may be any type of vehicle, for example a terrestrial vehicle such as a car or a truck, a water vehicle such as a boat or a ship, an air vehicle such as an airplane or a helicopter.

The method is computer-implemented and performed by interaction of a user with a computer system. This means that steps (or substantially all the steps) of the method are executed by at least one computer or any system alike, upon user commands. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For instance, the creation S10 may be performed via user-computer interaction. The displaying S20 may be performed fully automatically, for example without any triggering by the user and/or as a background process. The creation S30 may also be performed fully automatically, but optionally after a triggering of the user (e.g. launching a dedicated functionality of the system, for example by clicking on a predetermined button or icon).

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Although represented successively on FIG. 1, steps S10-S30 may be performed in an interlaced manner rather than sequentially.

For example, the displaying S20 may be performed continuously throughout the method, for example substantially real-time as the structural member features are created at S10. In particular, the method may comprise continuously and constantly (e.g. substantially real-time) determining a graphical representation of the mechanical structure, based on the structural member features created at S10, so as to display S20 such graphical representation to the user. This visual feedback assists the user in its design, as known from the field of CAD.

The creation S30 of corner features may also be performed interlaced with the creation S10 of structural member features, in other words as the creation S10 advances and each time a corner of the mechanical structure is specified (i.e. defined and/or modified). Alternatively, the creation S30 may be sequential to a phase of creation S10, in other words triggered once several corners are specified.

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system.

By CAD system, it is additionally meant any system adapted at least for designing a modeled object on the basis of a graphical representation of the modeled object, such as CATIA™ or SOLIDWORKS™. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object. By "3D modeled object", it is meant any object which is modeled by data allowing its 3D representation. A 3D representation allows the viewing of the mechanical structure from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process. Also, the 3D modeled object describes the 3D shape/geometry of the mechanical structure, in other words, the space distribution of material constitutive of the mechanical structure in the real world.

Figure 2:
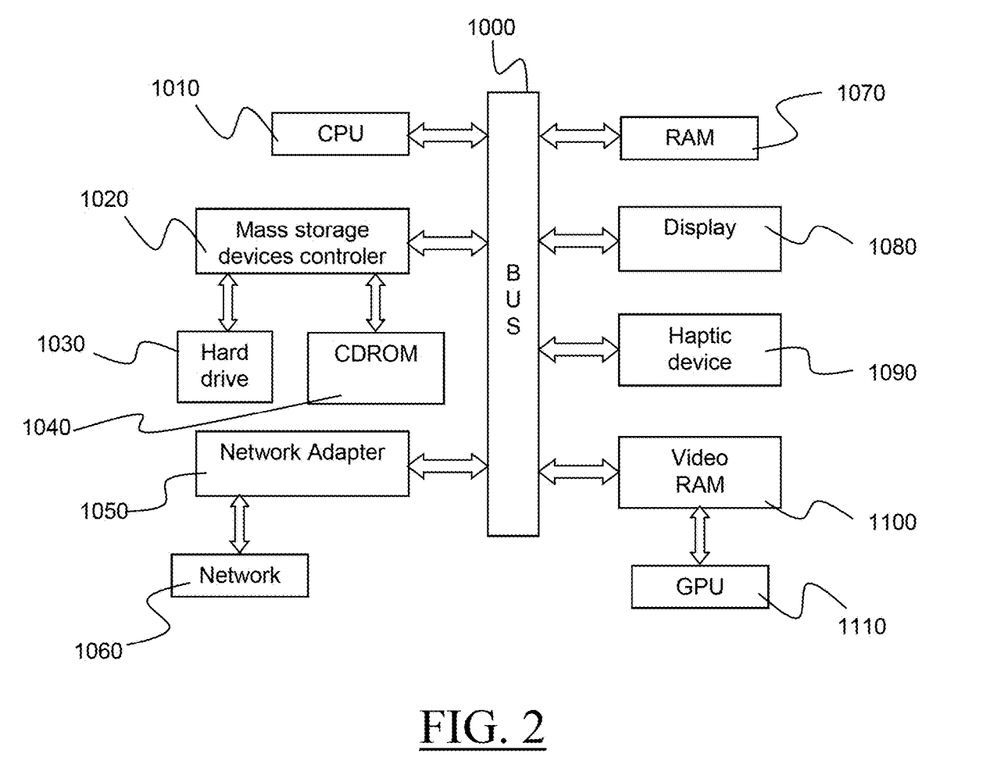
FIG. 2 shows an example of the system.

FIG. 2 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

"Designing a 3D modeled object" designates any action or series of actions which is at least part of a process of elaborating a 3D modeled object. Thus, the method may comprise creating the 3D modeled object from scratch. Alternatively, the method may comprise providing a 3D modeled object previously created, and then modifying the 3D modeled object.

The method may be included in a manufacturing process, which may comprise, after performing the method, producing a physical product corresponding to the modeled object. In any case, the mechanical structure represented by the modeled object designed by the method may be manufacturable. Because the method improves the design of the modeled object, the method also improves the manufacturing of a product and thus increases productivity of the manufacturing process.

The system is a feature-based CAD system configured for structural design.

A feature-based CAD system is as known per se from the field of CAD a system where a modeled object may be designed by creating a set of features. As widely known, CAD features are pieces of data comprising values of parameters and representing physical aspects of the real-world object represented by the modeled object being designed. Features are created in the feature-based CAD system by instantiating one of a predetermined set of feature classes (or feature types/categories) and/or editing instantiated features (i.e. defining or modifying values of parameters thereof). The features thereby created define the modeled object, or in other words they provide a parameterization of the product represented by the modeled object.

The CAD system may be configured for displaying one or more graphical items each indicative of a respective created feature (e.g. created at S10 and/or at S30), for example simultaneously to the graphical representation of the mechanical structure. The graphical items thereby provide a feature representation of the mechanical structure to the user. Graphical items may be displayed within a list (or "feature list"), that is, a graphical representation of the set of features where each feature is represented individually and successively. Such graphical items may be any kind of visual elements that allow the user recognizing the type and/or any other characteristic of the created features, such as symbols, icons or text descriptions. Additionally or alternatively, graphical items may be displayed within the graphical representation of the mechanical structure, such graphical items being for example markers visible (e.g. superimposed) on the graphical representation.

The feature-based CAD system may comprise a workspace window displayed to the user upon launching the system. The workspace window may comprise different distinct display areas (i.e. different portions of the window or panels). The display areas may optionally be separated by a visual border. The feature-based CAD system may be configured to display the graphical representation of the mechanical structure in a first display area, and the feature list in a second display area, optionally simultaneously, in examples upon user request. The first display area may represent a 3D space (also referred to as 3D "scene" or "design scene"). The second display area may be a panel adjacent to the first display area, for example rectangular and/or on the left of the scene. The feature list may be displayed vertically in the second display area. In examples, the feature list may be scrollable and/or expandable/shrinkable. In examples, the GUI may allow the user to select a type of feature, thereby triggering display of a list of features of said type.

In the feature-based CAD system, each graphical item may once displayed be selectable by the user for edition of its respective indicated feature. By "selectable", it is meant that the user can graphically interact with the graphical item for selection, for example including clicking on or touching the graphical item. Any graphical item may be selectable by the user in one single operation, for example in one single graphical selection (e.g. one single click or one single touch on the graphical item).

The interaction switches the CAD system from one first state where the indicated feature is not editable to a second state different from the first state in that the indicated feature becomes editable. Such switching may correspond to data respective to the feature being loaded in a specific volatile memory compartment, such that the data can be modified by further user-interaction. Feature edition may comprise opening one or more dialog boxes, selecting actions suggested via menu icons, and/or user-entering values of feature parameters, and/or user-acting on the graphical representation of the mechanical structure, for example by selecting and/or drag-and-dropping graphical representations of components of the mechanical structure, clicking or touching on locations of the graphical representation and/or actuating widgets on locations of the graphical representation.

Optionally, upon the user selecting a feature in the feature list, the system may automatically modify the displaying S20 and highlight the corresponding portion of the graphical representation of the mechanical structure corresponding to the selected feature. For example, when the user selects one or more structural member features, the system may automatically highlight the one or more corresponding structural members, and/or when the user selects one or more corner features, the system may automatically highlight the one or more corresponding corners and/or structural members connected at said corresponding corners. Such highlighting provides visual feedback to the user hat increases ergonomics.

The system allows structural design by providing for the creation S10 of structural member features. Each structural member feature may be created at S10 for example by user-interaction.

The creation S10 of a given structural member feature may be performed in different manners provided by the system being used. In all cases, the creation S10 may include the user positioning the given structural member feature in the 3D scene, in any manner. The positioning may comprise defining a curve in the 3D space, representative of the location in the 3D scene of the central axis of the structural member represented by the given structural member feature. In the following, when it is referred to the location or position of a structural member (or by extension location or position of the structural member feature that represents it) or of a portion thereof, it may thus be referred to said curve.

The structural members may have two extremities. The definition of the curve may for example include specifying (directly or indirectly) 3D location of the two extremities. In case of a straight structural member (for example if the system provides only for the possibility to represent straight structural members), the definition of the curve may end there as no additional information is required. In case of a curved (i.e. non-straight) structural member, the positioning may additionally comprise specifying the curved shape (since the system cannot assume that a straight segment is being designed), or alternatively the curved shape may be specified by default (in case a mechanical structure having curved in a default manner is being designed).

A structural member may be created at S10 without using any other structural member. In such a case, the created structural member feature may be referred to as a "primary" structural member feature. Alternatively, a structural member feature may be created at S10 using one or more (e.g. two) other structural member, for example as positioning constraints. In such a case, the created structural member feature may be referred to as a "secondary" structural member.

In examples of creating a secondary structural member feature, one or both the extremities of the secondary structural member feature may be positioned each at a respective extremity of one of the one or more other structural member features (e.g. specified after selection of said respective extremity—optionally graphically in the 3D scene) or at any other respective location of one of the one or more other structural member features (e.g. specified after selection of said structural member feature—optionally graphically in the 3D scene, and value entering of a coordinate thereon—optionally via a dialog box).

Additionally or alternatively, the system may provide for generating information representing a grid that serves as a support for arrangement of the structural members to be created. The method may comprise displaying the grid in the 3D scene, for example simultaneously to the graphical representation of the mechanical structure and/or superimposed over it. The system may comprise a command for the user to start or stop such display. The grid may present fixed and/or predetermined dimensions. Alternatively, the dimensions of the grid may be defined based on structural member features already created, for example so that the grid conforms to said already created structural members (i.e. so that the structural members are edges of the grid), e.g. while taking into account a constraint of regularity (since structural design may require a certain level of regularity in the arrangement of structural members) and/or a constraint of coarseness (since the designer may require not being overwhelmed with too much information in the form of a too fine grid).

The grid defines geometrical elements including vertices, edges (i.e. segments), lines, faces, and planes. When displayed, at least part of such geometrical elements may be selectable by the user for the positioning of a given structural member feature in the 3D scene. For example, two vertices of the grid may be selected to specify the two extremities of the given structural member feature. Alternatively, an edge may be selected to specify the location of the given structural member feature. Yet alternatively, a line, an edge, a plane or a face may be selected but only to constrain the positioning of a structural member thereon, the exact positioning being specified in another manner. For example, an edge or a face may be selected and an exact location thereon specified by entering one or more coordinate values, for example via a dialog box, for example to position a structural member extremity. The system may provide for any one or any combination of such grid uses to position structural elements.

Structural design indeed involves creating patterns of structural members at least partly matching a grid. Generating a grid to assist the user in creating the structural member features at S10 thereby improves ergonomics in structural design. In examples where a grid is generated, the grid may be optionally calculated so as to provide a stable mechanical structure, that is, as a function of a predetermined mechanical stability constraint.

In examples, the method may comprise generating a grid pattern. Then structural member features are positioned each to fit a respective grid segment. All grid segments need not be fitted. Then, the user may ask for refinement of the grid pattern, for example by calling for generation of a plane at the middle of two already generated planes. Thanks to such refinement, new grid segments are available at new locations. New structural members may be positioned to fit such new grid segments. Alternatively or additionally, the user may position secondary structural members using already existing ones. This can be optionally performed without having refined the grid. On the other hand, the secondary structural members can themselves induce refinement of the grid. This process can be repeated. With such a repeated process, the user reaches a mechanical structure, with structural members connecting at corners, the corners being located at vertices of the final grid.

In examples, the user may have initially specified the type of mechanical structure intended to be designed. In other examples, the system is set for a predetermined type of mechanical structure.

Also, in examples, the creation S10 may further include specifying a type, a material and/or a profile (i.e. geometry of the cross-section, e.g. perpendicular to the curve) of the structural member represented by the given structural member feature. Alternatively or additionally, the system may present a default behavior for at least part of such information. Optionally, the default behavior may or may not be user-overridable.

Upon creation at S10 of a given structural member, the system may compute and/or graphically represent (and optionally display at S20) a volume corresponding to the specifications of the structural member feature. The volume represents the 3D shape of the structural member. The volume may be computed as a swept volume, for example equal to the result of sweeping the profile between the two 3D positions of the extremities of the structural member (e.g. all defined when specifying the structural member feature). The sweeping may be along the curve (e.g. for example straight in case of a straight curve).

At least some of the above principles related to creating structural member features are known from the field of structural design with feature-based CAD systems, and in particular from Solidworks™ by Dassault Systèmes, Tekla™ by company Trimble, Advance Steel™ by company Graitec, or Revit™ by company Autodesk. Examples of design methods using these software can be found at the following URLs (as accessible at the priority date of the present application):

https://www.youtube.com/watch?v=oF0sXb34IWU
https://www.youtube.com/watch?v=RBOIKIN6cGg
https://www.youtube.com/watch?v=dCYT7N7Z-Uk
https://www.youtube.com/watch?v=OX7dQJDYj84

A feature of a modeled object may be independent, i.e. referring to no other feature. Alternatively, a created feature may be dependent, i.e. referring to one or more other features (e.g. by including a pointer in the data specifying the feature). In such a case, the set of features is hierarchized, including one or more features referring each to one or more respective other features. For example, each given corner feature created at S30 may refer to all the respective structural member features created at S10 which are connected at the corner that said given corner feature represents.

The method allows, thanks to the automatic creation S30, management of corners of the mechanical structure as features, thereby extending capabilities specific to the "feature-based" character of the CAD system to such corner management. In particular, the user may specify corners directly by editing corner features created at S30. In examples, such edition of a given corner feature is made possible and easy after the user selecting said given corner feature, for example graphically on the graphical representation and/or in the feature list (e.g. within the second display area and/or with simultaneous highlighting of the corner in the first display area, as explained above).

In examples, the proposed method comprises for one or more given corners displaying graphical items indicative of the given corners (e.g. in the list displayed in the second display area), while simultaneously the graphical representation of the mechanical structure is displayed (e.g. in the second display area) such that at least part of the given corners are at least partly invisible to the user. In such examples, the user can still select and/or edit said given corners easily thanks to the feature list.

Figure 3:
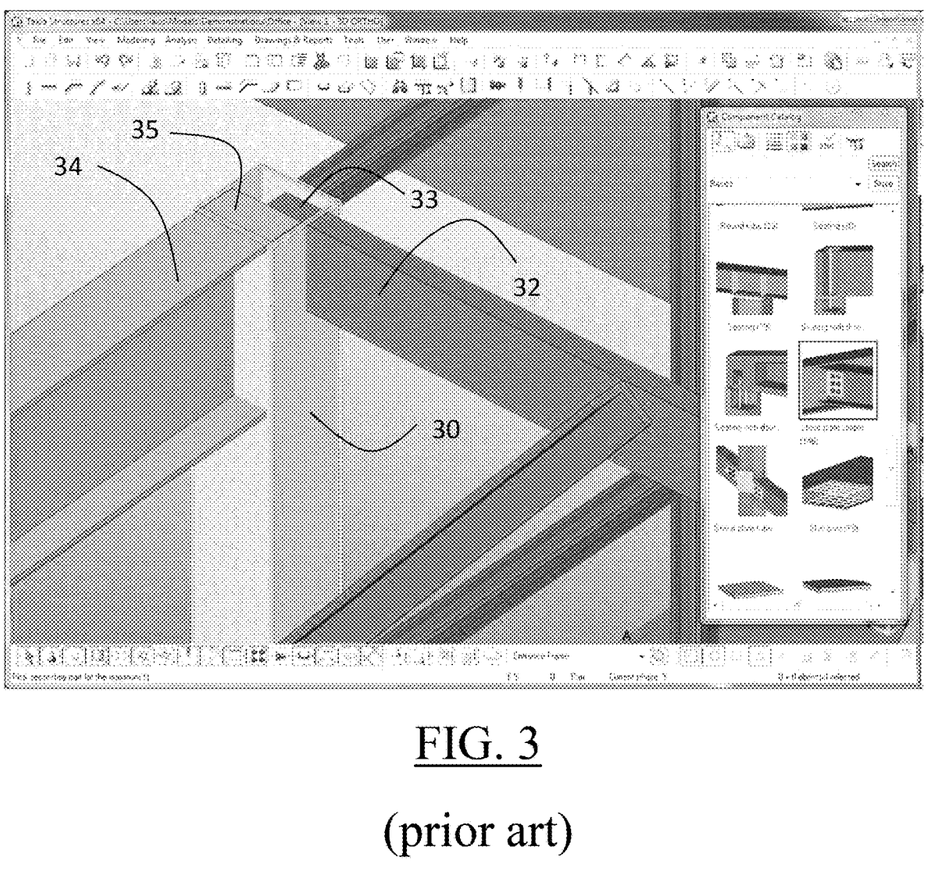
FIG. 3 shows an example of the prior art.

FIG. 3 shows a screenshot of a prior art system. In such prior art, the user has to manually identify a corner location in the model to select and apply a joint definition. For example, the user has to manually select structural members 30, 32, and 34 in order to trim ends 33 and 35 of structural members 32 and 34 that overlap with structural member 30 (since such overlapping of material is physically inconsistent and thus to avoid in the final design). Such prior art selection not only requires many user-actions, but it is also difficult to make as the user might be unaware of all corners in a complex 3D modeled object (for example, some corners may be hidden or hardly visible on the graphical representation of the mechanical structure).

Contrary to that, the method automatically captures corners at S30 in the model each in a parametric feature, such that the parametric feature can be selected easily (for example in a feature list), and for example a corner trimming can be applied to it. This improves ergonomics compared to the prior art where the user is required to select one-by-one structural member features connected at a corner in order to specify said corner. Furthermore, the automatic creation of corners at S30 allows accuracy in corner design, as well as consistency since the same rules are applied. In addition, the parameterization of corners allows modifying all corners at once if a design change is performed. Also, corners and/or features depending on corner features may be updated automatically if structural elements are modified during the design.

Optionally, the creation of a corner feature at S30 may include determining a type of the corner feature. The type may be one of a predetermined set of types, each depending on the number of structural members connected at the represented corner and/or on the location of the connection with respect to the connected structural members.

The predetermined set of types may for example include the "simple corner" type, the "two-member/two-point corner" type, and the "complex corner" type. A simple corner is a corner where exactly two structural members are connected, one of which not at an extremity thereof (e.g. an extremity of one of the two structural members arrives at a location of the other structural member which is not an extremity of said other structural member). A two-member corner is a corner where exactly two structural members are connected, both at an extremity thereof (i.e. an extremity of one of the two structural members arrives at an extremity of the other structural member). A complex corner is a corner where strictly more than two structural members are connected (e.g. extremities of two or more structural members arrive at a third structural member, for example at an extremity thereof or alternatively at a non-extremity location thereof).

In addition to representing corners to the user and optionally allowing user-selection thereof, thanks to the automatic creation of corner features at S30, the system is configured for editing/specifying the corner features created. In other words, the feature-based CAD system comprises functionalities corresponding to design edition operations which are configured to take corner features as inputs and determine values for their parameters so as to perform structural design.

The feature-based CAD system may in particular comprise any one or any combination of the following corner editions:
 a. specifying trimming information,
 b. specifying a connection type, and/or
 c. defining a connected element.

Corner Edition a: Specifying Trimming Information

The user may select a corner feature and specify information representing a manner to trim the volume representing one or more of the structural members connected together at the corner. The result of such trimming may then be displayed to the user on the graphical representation of the mechanical structure.

In examples, the corner feature may be of the complex corner type or of the simple corner type. In such a case, the trimming may include determining a main structural member feature and trimming/subtracting the volume of the other structural member feature(s) by the volume of said main structural member (whose volume may be left untouched).

The corner feature may for example correspond to one reference structural member feature (e.g. a primary structural member feature or not) and one or more secondary structural member features defined using said reference structural member feature. In such a case, the reference structural member feature may be the main structural member feature. This corresponds to design intent that the reference structural member feature corresponds to the main structural member.

The corner feature may alternatively correspond chronologically (with respect to the design process) to one initial structural member feature and one or more ulterior structural member features. In such a case, the initial structural member feature may be the main structural member feature. This corresponds to design intent that the initial structural member feature corresponds to the main structural member.

In examples, the corner feature may be of the two-member corner type. In such a case, the principles of the complex and simple corner types examples may apply, or alternatively the user may specify whether the trimming is to be planar, symmetric, and/or of any other characteristic. Indeed, for a two-member corner type, there is often no "main" structural member in the design intent.

The user may create structural member features at S10 in a certain way (described above) and thereby represent corners inconsistently (e.g. including material of distinct structural members overlapping). This is notably due to the swept volume calculations which may be kept basic in order to be fast. However, the method may allow for correcting such inconsistency at S30 via corner edition, for example by trimming said material such that the distinct structural members still contact (e.g. with no interstice) but do not overlap. The method may further allow for specifying a trimming type.

Corner Edition b: Specifying a Connection Type

Depending upon how many structural members are participating in a corner, corners can self-categorize themselves into simple, two member and complex corners with their specific edit options.

In addition, the user may specify whether the corner is mechanical, thermic, and/or chemical. Optionally, the user may specify in which case how precisely the connection is achieved (e.g. mere contact or fastener, type of sticking, and/or type of welding).

Corner Edition c: Defining a Connected Element

The corner being at least mechanical, the user may specify an element connected to the structural members at the corner and connecting mechanically together all the structural members.

Corner editions b and c allow adding information to the structural design in an ergonomic manner, thanks to corner features being created at S30 to be selectable and editable.

All these editions may be performed in any way, for example via a dialog box and/or suggested menu icons. Also, at least part of these editions may be performed automatically upon the creation S30, for example by the system or user having set a default behavior, and/or depending on different parameters (such as the corner type and/or parameters of the structural element features).

In addition to selection and edition of corners, the creation of corner features at S30 offers new capabilities making structural design even more ergonomic.

For example, the user may select and/or edit corner features in bulk. For instance, the user may select all corner features of a same type. Additionally or alternatively, the user may launch a multiple/bulk selection function and add corner features to the list. Such bulk selection allows for performing a corner edition in bulk to all selected corner features.

Additionally or alternatively, the user may for example ask the system to replicate or propagate an edition performed for one corner feature to one or more other corner features.

Such functionalities which allow great time-saving are permitted by the feature-based and parametric representation of corners offered by the method.

An example of the automatic creation of corner features at S30 is now discussed.

It has been explained how structural member features are created at S10 by positioning at least some structural member extremities on locations occupied by structural members already positioned (at previous occurrences of S10). Such specific positioning can be performed in any way by the user, for example including a graphical selection (e.g. by clicking or touching a selectable item) in the 3D scene (e.g. graphical selection and drag and-drop of a structural member extremity to an arriving position in the 3D scene, or mere selection of location, such as the arriving position or a zone comprising the arriving position, for example another structural member or a geometrical element of the grid) and/or by specifying values in a dialog box or selecting menu icons.

This can occur for example because the user is specifying a secondary structural member feature, thereby using a reference structural member feature and defining a position thereon where an extremity of the secondary structural member arrives. This can also occur because the user is specifying a position on a grid for the extremity of a currently created structural member, where a previously created structural member is already positioned.

The method may comprise memorizing such actions, so as to be able to later create corner features depending on such memorized information.

Specifically, each time a structural member is positioned in the 3D scene, the method may generate (i.e. determine) and store information describing said positioning. The information can then be relied upon for creating the corner features, optionally for determining parameters thereof (such as the corner positions and/or the corner types). In particular, each time a user positions an extremity where another structural member is already positioned, the system may generate and store corresponding information.

When a secondary structural member feature is created, the user specifies at some point a position on the reference structural member feature. Information indicating such fact may be generated and/or stored. Each time a structural member feature is created, the user specifies at some point positions of the extremities thereof. Information indicating such fact may be generated and/or stored. For example, if the user specifies said positions on the grid, then when later another structural member feature is created at a corresponding location of the grid, then the position can be compared and it can be determined easily (i.e. with rapid computations) whether the newly created structural member connects with the previously created structural member. Again, information indicating the result of the comparison (e.g. if positive) may be generated and/or stored.

Such automatic information generation and/or storing can be invisible to the user, who may in examples merely perform drag-and-drop actions, graphical selections, or dialog box actions.

Thus, in examples, the method may provide for:
1. Separation of structural member design into creation phase followed by corner trimming phase.
2. Automatic generation of a 3D grid sketch to represent each structural member created based on its definition.
3. Definition of secondary members based on grid segment of primary members.
4. Automatic identification of member connection based on their definition and 3D grid segments.
5. Automatic separation and aggregation of member connections into different types of corners based on number of interacting members and the type of interactions.
6. Automatic creation of parametric corner features which maintain member connectivity and automatically adjust and update for any changes in the structural design.

In a structural design process, it may be relatively easy to layout all structural members in the space to capture the overall design intent of the design. But the problem scales up when the user has to go into details of the design with appropriate joint and connection, and for example run estimates on how many joints exist in the model. In the prior art, this is typically left to user's visual inspections and manual calculations/actions. The issues scale up further when the user has defined all joint/connections initially and then wants to change joint/connection type.

The method may thus in examples give users a parametric list of all corners created in the design. The list may update/modify as the design changes. Hence, the user may have more accuracy and efficiency in their design, notably because they do not have to rely on any manual and visual inspection method. These parametric corners can be used as an input to define specific joint and connection types. This can be easily modified at one corner and then propagated to all similar corners. These capabilities may make structure detailing process super accurate and efficient in both definition and edition of connections and joints at corners.

FIGS. 4-8 illustrate an example of running the method with an example of the GUI of the system, for designing a 3D modeled object representing a mechanical structure which is a steel structure.

Figure 4:
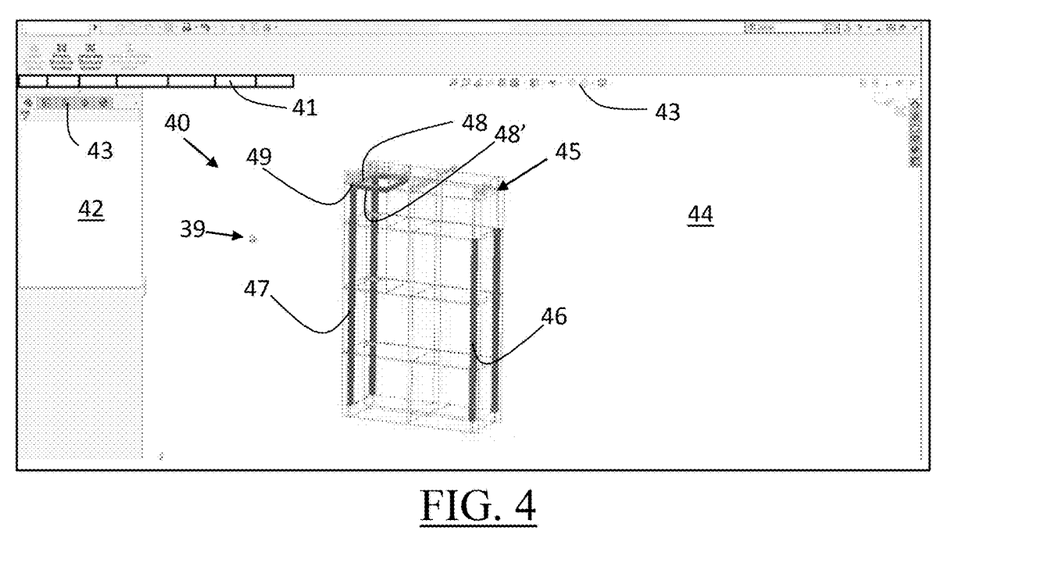
FIGS. 4-8 illustrate an example of the method.

Referring to FIG. 4, the GUI may be a typical CAD-like interface, having standard menu bars 41, 43. Such menu- and toolbars contain a set of user-selectable icons 43, each icon being associated with one or more operations or functions, as known in the art. Some of these icons are associated with software tools, adapted for editing and/or working on the 3D modeled object 40 which represents a mechanical structure and is displayed in the 3D scene display area 44 of the GUI. The software tools may be grouped into workbenches. Each workbench comprises a subset of software tools. In particular, one of the workbenches is an edition workbench, suitable for editing geometrical features of the modeled product 40. In operation, a designer may for example pre-select a part of the object 40 and then initiate an operation (e.g. change the dimension, color, etc.) or edit geometrical constraints by selecting an appropriate icon. The GUI may for example display data related to the displayed product 40 in a second display panel 42 aside the 3D scene 44 and rectangular. A cursor 39 may be controlled by a haptic device to allow the user to interact with the graphic tools.

As shown on FIG. 4, 3D modeled object 40 is designed using a parallelepiped grid 45 made of straight segments, and comprises structural member features including columns 46 and 47 and beams 48 and 48' each fitting (i.e. matching in direction and length) one or a succession of several segments of grid 45. Grid 45 helps the user position structural member features 46, 47, 48 and 48' in a mechanically consistent manner.

In examples, in order to create each of structural member features 46, 47, 48 and 48', the user may perform the following. First, the user may launch a primary structural member creation functionality of the system. Second, the user may select one or more grid segments to be occupied by the primary structural member being created. Third, the user may validate the creation. This process can be repeated to design as many primary structural members as wanted, and the system may be configured for grid 45 to be refined to offer more possibilities to the user (e.g. automatically and/or manually, optionally progressively as the creation of structural member features advances).

As shown on FIG. 4, the resulting mechanical structure comprises corners including one at vertex 49, corresponding to structural member features 47 and 48 connecting at a same vertex 49 of grid 45. At this stage of the design process, 3D modeled object 40 may comprise no corner feature. However, the system has generated information that structural member features 47, 48 and 48' are positioned so as to all have an extremity commonly positioned at vertex 49. For example, if structural member feature 47 was initially created, then when structural member features 48 and 48' are later created, the system may recognize that a respective extremity of each of structural member features 48 and 48' is being positioned at a location (vertex 49) where an extremity of structural member feature 47 is already positioned. The system may automatically generate and store data describing such information. Such information can then be based upon to create a corresponding corner feature located at vertex 49 and of the complex type (since it connects three structural members 47, 48 and 48').

Figure 5:
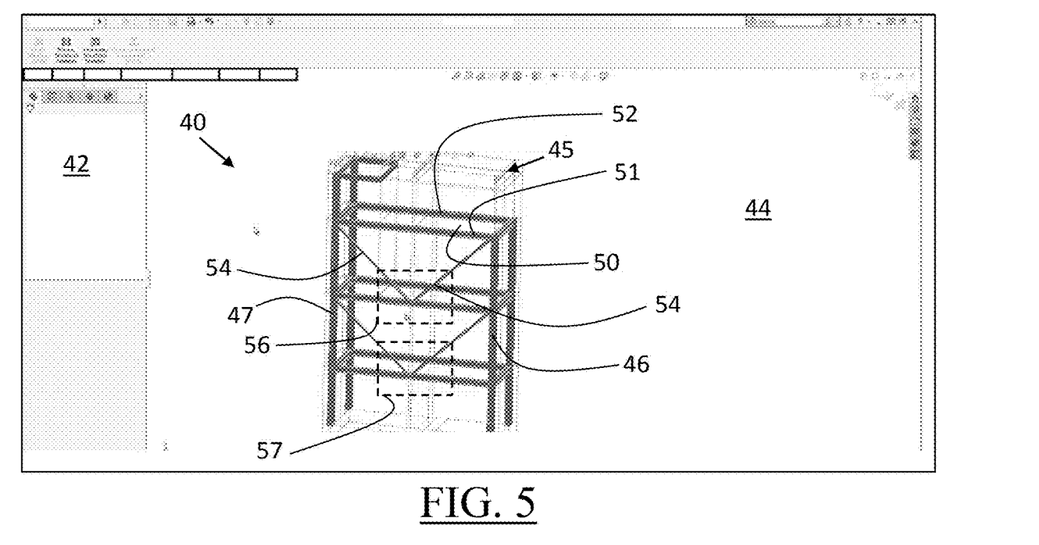

Referring to FIG. 5, the user may add additional structural members 51, 52, and 54. In order to do so, the user may for example launch a secondary structural member creation functionality of the system, and select for each secondary structural member to be added two reference structural members. For example, to add secondary structural member 51, the user may refer to structural members 46 and 47 to constraint the positioning of secondary structural member 51 therebetween. Then, the user may either require that the secondary structural member 51 being created be located in plane 50 of grid 45, or the user may specify locations on structural members 46 and 47 or vertices of the grid that are to form the extremities of the secondary structural member 51 being created. The system may in either case recognize that the extremities of structural member features 51 are being positioned one at a location where structural member feature 47 is already positioned, and the other one where structural member feature 46 is already positioned. The system may automatically generate and store data describing such information. Such information can then be based upon to create a corresponding corner feature located at corresponding vertices 49 and of the complex type.

The user may similarly create oblique reinforcements 54, leading to corners 56 and 57, based on which the system can also automatically create corresponding corner features.

Figure 6:
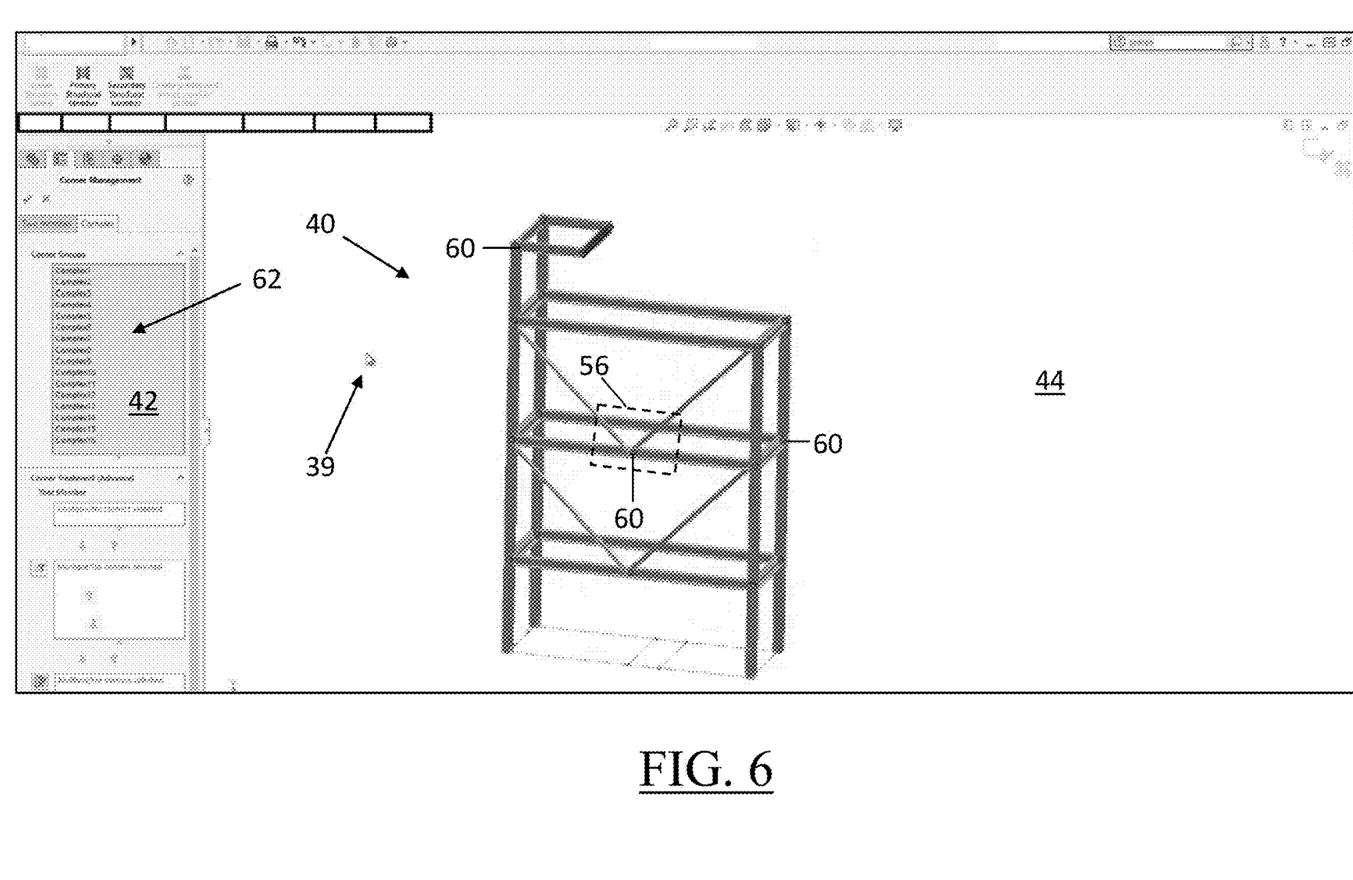

Referring to FIG. 6, once corner features are automatically created based on the information generated while the user was creating structural member features, the corner features may be represented as a feature list 62 in panel 42, each corner feature being designated by a textual description. This feature list representation may be displayed upon user request. Feature list 62 may for example be restricted to a type of corners. In the examples of the figures, 3D modeled object 40 only comprises complex corners, and all corners are represented by a textual graphical item of the type "Complex N" where N is an index indicating the rank of each complex corner in the chronological order of their creations.

As shown on FIG. 6, in addition to feature list 62, the system may display markers 60 superimposed on the graphical representation of 3D modeled object 40 in 3D scene 44, each marker 60 being indicative of a respective corner feature and thus corresponding to an element of feature list 62. A corner feature of 3D modeled object 40 may then be selected by the user for edition by graphical selection (e.g. clicking with mouse cursor 39 thereon) of the corresponding element of feature list 62 and/or of the corresponding marker 60. For example, corner feature 56 may be selected for edition.

Figure 7:
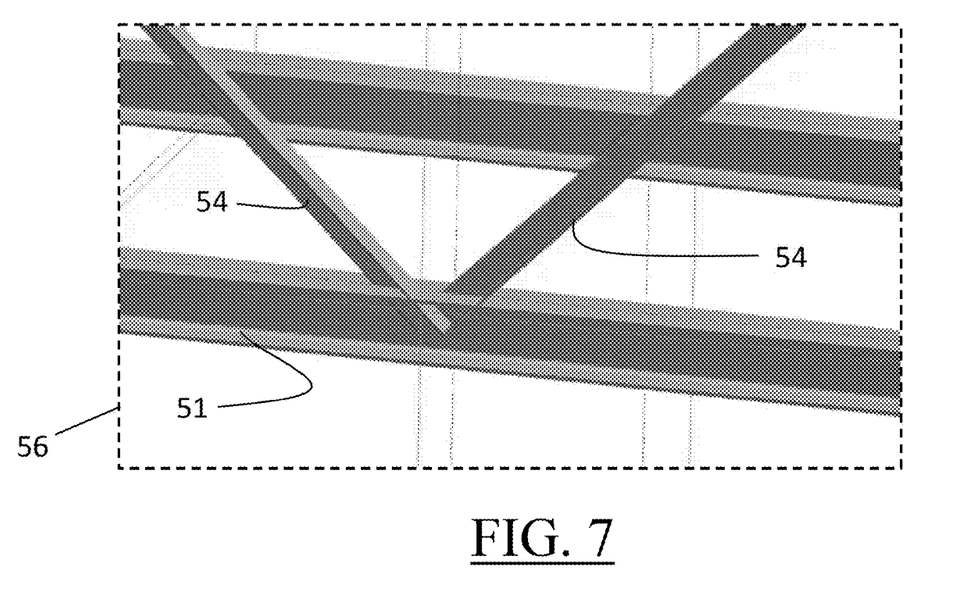

Referring to FIG. 7, corner feature 56 is a complex corner which corresponds to a connection between secondary oblique reinforcement structural elements 54 connect to beam structural element 51. As can be seen, the swept volume generation of the system results in inconsistent material overlap at the connection.

Figure 8:
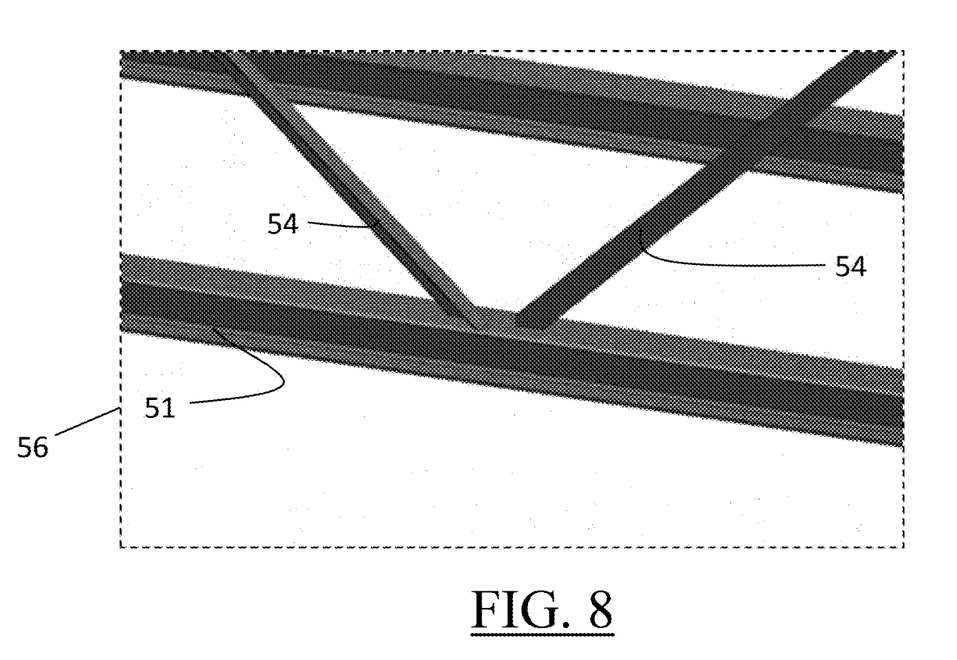

Referring to FIG. 8, the user may apply a trimming operation to corner 56 after having selected corner 56. The user may specify that the volume of beam structural element 51 is to trim the volumes of secondary oblique reinforcement structural elements 54, or this behavior may be a default behavior of the system in such a situation.

As shown by FIGS. 4-8, the system thereby allows a user to ergonomically design a mechanical structure, by creating structural member features connecting at corners. The system then automatically creates corner features, which represents useful information to the user. In the illustrated example, a corner feature can notably be selected easily by the user for any type of edition, for example a trimming edition. Not only does the system allow eventually trimming swept volumes to achieve mechanical/material consistency, it does so in an ergonomic way as the user can select a corner feature to be edited in one single operation (e.g. a single graphical selection).

[OPTIONAL The teachings of all patents, published applications and references cited herein are incorporated by reference in their entirety.]

While example embodiments have been particularly shown and described, it will be understood by those skilled in the art that various changes in form and details may be made therein without departing from the scope of the embodiments encompassed by the appended claims.

The invention claimed is:

1. A computer-implemented method for designing a 3D modeled object by interaction of a user with a feature-based CAD system, the 3D modeled object representing a mechanical structure, the mechanical structure including structural members, the mechanical structure further including corners, respective structural members being connected together at each corner, the method comprising:
creating structural member features in response to an interaction of the user with the feature-based CAD system, each structural member feature representing a respective structural member of the mechanical structure;
displaying to the user a graphical representation of the mechanical structure based on the structural member features created in response to the interaction of the user with the feature-based CAD system;
creating corner features, each corner feature being a separate and distinct unit of data comprising values of parameters and representing a respective corner of the mechanical structure, the creation of the corner features being performed automatically by the system without user action between capture of different corners, the corner features being editable by the user, wherein the automatic creation of a corner feature of a corresponding corner includes determining a type depending on number of structural members connected at the corresponding corner and on location of resulting connection with respect to the connected structural members, the automatically created corner features thereby parametrizing connections between structural members of the mechanical structure; and
displaying one or more graphical items each indicative of a respective corner feature, each graphical item being individually selectable by the user for individual edition of its respective corner feature, the individual edition of the respective corner feature of an individually selected graphical item being independent of affecting corner features of non-selected graphical elements.

2. The method of claim 1, wherein the method comprises displaying a list including the one or more graphical items.

3. The method of claim 2, wherein the method comprises displaying:
the graphical representation of the mechanical structure in a first display area, and
the list in a second display area.

4. The method of claim 1, wherein creating the structural member features comprises, for at least one extremity of the respective structural member represented by at least one structural member feature:

by the user, positioning said at least one extremity at a location where another structural member is already positioned; and then
automatically by the system, generating information describing said positioning, the creation of a respective corner feature being based on said information.

5. The method of claim 4, wherein the positioning comprises a selection of the other structural member or of a geometrical element of a grid where the other structural member is positioned, the information describing said positioning comprising an indication of such selection.

6. The method of claim 1, wherein at least one corner feature is adapted for any one or any combination of the following editions, with respect to one or more of the structural member features connected together at the corner represented by the at least one corner feature:
specifying trimming information,
specifying a connection type, and/or
defining a connected element.

7. The method of claim 1, wherein the corner features are selectable and editable in bulk, and/or the system is adapted for automatic replication of a user edition of a corner feature to one or more other corner features.

8. The method of claim 1, wherein the mechanical structure is:
a building,
a machine frame,
a structure system based on an aluminum extrusion profile,
a steel structure,
a welded structure, or
a vehicle structure.

9. A non-transitory computer-readable medium having recorded thereon a computer program comprising instructions for performing a computer-implemented method for designing a 3D modeled object by interaction of a user with a feature-based CAD system, the 3D modeled object representing a mechanical structure, the mechanical structure including structural members, the mechanical structure further including corners, respective structural members being connected together at each corner, the method comprising:
creating structural member features in response to an interaction of the user with the feature-based CAD system, each structural member feature representing a respective structural member of the mechanical structure;
displaying to the user a graphical representation of the mechanical structure based on the structural member features created in response to the interaction of the user with the feature-based CAD system;
creating corner features, each corner feature being a separate and distinct unit of data comprising values of parameters and representing a respective corner of the mechanical structure, the creation of the corner features being performed automatically by the system without user action between capture of different corners, the corner features being editable by the user, wherein the automatic creation of a corner feature of a corresponding corner includes determining a type depending on number of structural members connected at the corresponding corner and on location of resulting connection with respect to the connected structural members, the automatically created corner features thereby parametrizing connections between structural members of the mechanical structure; and
displaying one or more graphical items each indicative of a respective corner feature, each graphical item being individually selectable by the user for individual edition of its respective corner feature, the individual edition of the respective corner feature of an individually selected graphical item not affecting corner features of non-selected graphical elements.

10. The medium of claim 9, wherein the method comprises displaying a list including the one or more graphical items.

11. The medium of claim 10, wherein the method comprises displaying:
the graphical representation of the mechanical structure in a first display area, and
the list in a second display area.

12. The medium of claim 9, wherein creating the structural member features comprises, for at least one extremity of the respective structural member represented by at least one structural member feature:
by the user, positioning said at least one extremity at a location where another structural member is already positioned; and then
automatically by the system, generating information describing said positioning, the creation of a respective corner feature being based on said information.

13. The medium of claim 12, wherein the positioning comprises a selection of the other structural member or of a geometrical element of a grid where the other structural member is positioned, the information describing said positioning comprising an indication of such selection.

14. The medium of claim 9, wherein the mechanical structure is:
a building,
a machine frame,
a structure system based on an aluminum extrusion profile,
a steel structure,
a welded structure, or
a vehicle structure.

15. A feature-based CAD system comprising:
a processor coupled to a memory,
the memory having recorded thereon a computer program comprising instructions for performing a computer-implemented method for designing a 3D modeled object by interaction of a user with a feature-based CAD system, the 3D modeled object representing a mechanical structure, the mechanical structure including structural members, the mechanical structure further including corners, respective structural members being connected together at each corner, the method comprising:
creating structural member features in response to an interaction of the user with the feature-based CAD system, each structural member feature representing a respective structural member of the mechanical structure;
displaying to the user a graphical representation of the mechanical structure based on the structural member features created in response to the interaction of the user with the feature-based CAD system;
creating corner features, each corner feature being a separate and distinct unit of data comprising values of parameters and representing a respective corner of the mechanical structure, the creation of the corner features being performed automatically by the system without user action between capture of different corners, the corner features being editable by the user, wherein the automatic creation of a corner feature of a corresponding corner includes determining a type depending on number of structural members connected at the corresponding corner and on location of resulting connection with respect to the connected structural members, the automatically created corner features thereby parametrizing connections between structural members of the mechanical structure; and
displaying one or more graphical items each indicative of a respective corner feature, each graphical item being individually selectable by the user for individual edition of its respective corner feature, the individual edition of the respective corner feature of an individually selected graphical item not affecting corner features of non-selected graphical elements.

16. The system of claim 15, wherein the method comprises displaying a list including the one or more graphical items.

17. The system of claim 16, wherein the method comprises displaying:
the graphical representation of the mechanical structure in a first display area, and
the list in a second display area.

18. A computer-implemented method for designing a 3D modeled object by interaction of a user with a feature-based CAD system, the 3D modeled object representing a mechanical structure, the mechanical structure including structural members, the mechanical structure further including corners, respective structural members being connected together at each corner, the method comprising:
creating structural member features in response to an interaction of the user with the feature-based CAD system, each structural member feature representing a respective structural member of the mechanical structure;
displaying to the user a graphical representation of the mechanical structure based on the structural member features created in response to the interaction of the user with the feature-based CAD system; and
creating corner features, each corner feature being a separate and distinct unit of data comprising values of parameters and representing a respective corner of the mechanical structure, the creation of the corner features being performed automatically by the feature-based CAD system free of user interaction between capture of different corners, the corner features being editable by the user, wherein the automatic creation of a corner feature of a corresponding corner includes automatically determining a type depending on number of structural members connected at the corresponding corner and/or on location of resulting connection with respect to the connected structural members, the determining of the type of each corner feature being performed among a predetermined set of types without manual intervention of the user, the automatically created corner features thereby parametrizing connections between structural members of the mechanical structure.

* * * * *